United States Patent [19]
Ferguson

[11] 3,789,532
[45] Feb. 5, 1974

[54] PURSE SEINE CABLE RING

[76] Inventor: Emery J. Ferguson, 3654 Kingsley, San Diego, Calif. 92106

[22] Filed: Dec. 15, 1972

[21] Appl. No.: 315,625

[52] U.S. Cl. .................................................. 43/14
[51] Int. Cl. ............................................. A01k 73/12
[58] Field of Search ............................. 43/14, 10, 8

[56] References Cited
UNITED STATES PATENTS

| | | | |
|---|---|---|---|
| 712,494 | 11/1902 | Butler | 43/14 |
| 742,160 | 10/1903 | Butler | 43/14 |
| 3,064,384 | 11/1962 | Lewis et al. | 43/14 |

Primary Examiner—Louis G. Mancene
Assistant Examiner—Daniel J. Leach
Attorney, Agent, or Firm—Richard K. MacNeill

[57] ABSTRACT

A purse seine cable ring of the type utilized with purse seine nets for anchoring and guiding a draw cable in which the rings have recesses or corners on the inner surface thereof to form a plurality of natural orientation points for minimizing the tendency of the prior art cable rings to orient in one position thereby encouraging excessive wear along one specific area of the ring due to the friction of the draw cable thereon.

1 Claim, 5 Drawing Figures

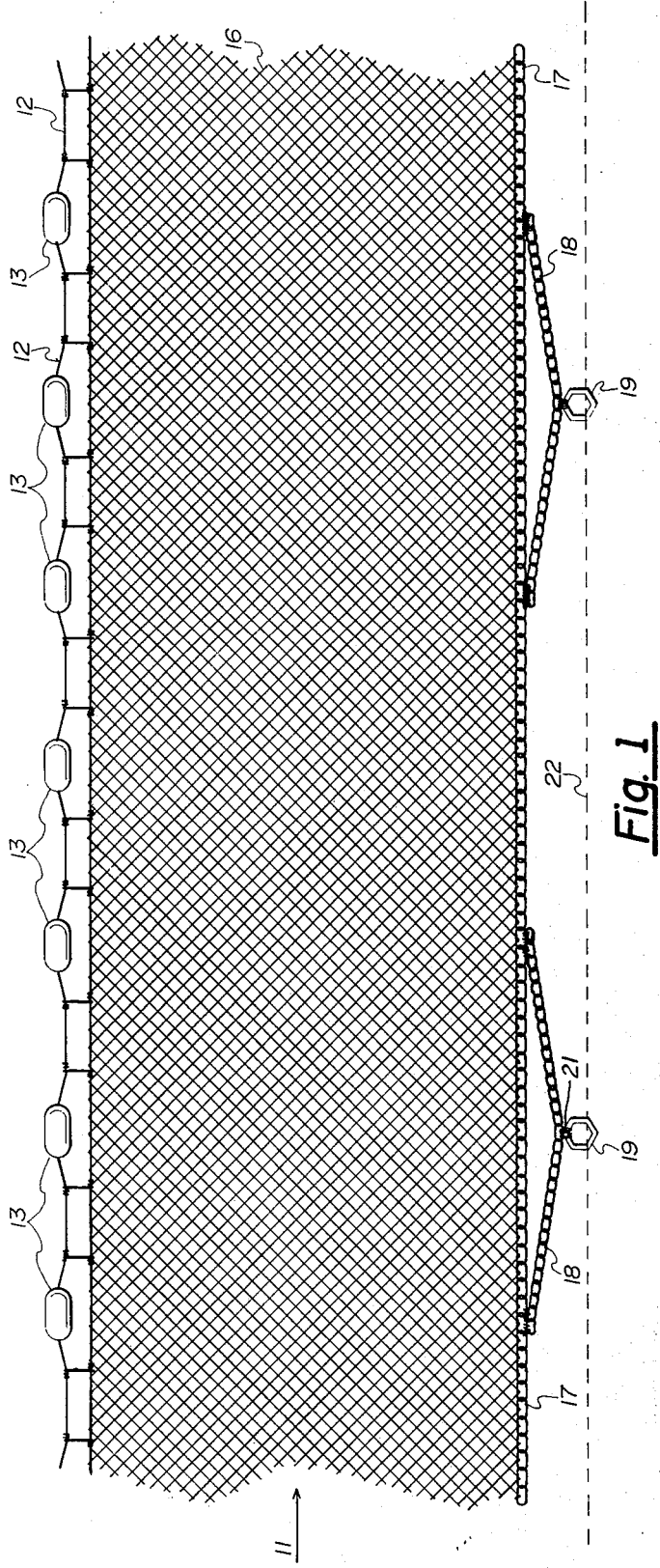
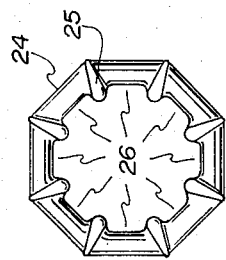
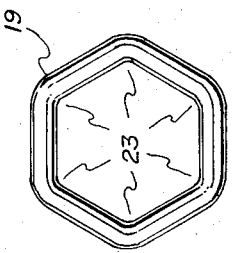
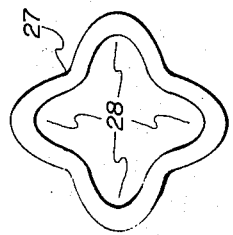
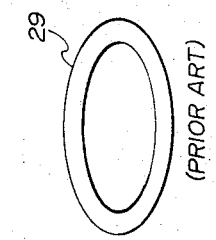

PURSE SEINE CABLE RING

BRIEF DESCRIPTION OF THE INVENTION

The present invention relates to a purse seine cable ring and more particularly to a purse seine cable ring having a geometry for distributing frictional wear.

According to the invention a purse seine cable ring is provided having either a plurality of corners on the inside surface thereof or a plurality of recesses. This configuration results in having a plurality of natural orientation positions to distribute frictional wear of the draw cable which is common in the prior art smooth-surfaced cable rings. The problem with the prior art smooth-surface cable rings has been their tendency to orient in one position (since they are not perfectly round) resulting in a maximizing of frictional wear in a given area from the draw cable. It is pointed out that in this application a corner on the inside surface of the cable ring and a recess will both be treated as recesses since their result is substantially identical.

An object of the present invention is the provision of a novel purse seine cable ring.

Another object of the invention is the provision of a purse seine cable ring having a plurality of recesses on the inner surface thereof.

A still further object of the invention is the provision of a purse seine cable ring having a maximum life.

Other objects and many of the attendant advantages will be readily appreciated as the same becomes better understood by reference to the following detailed description when considered in connection with the accompanying drawings in which like reference numerals designate like parts throughout the FIGS. thereof and wherein:

FIG. 1 is a schematic representation of a preferred embodiment of the present invention is situ;

FIG. 2 is a side-elevational view of the embodiment of FIG. 1;

FIG. 3 is a side-elevational view of another embodiment of the present invention;

FIG. 4 is a side-elevational view of still another embodiment of the present invention; and FIG. 5 is a side-elevational view of a prior art purse seine cable ring.

DETAILED DESCRIPTION OF THE INVENTION

Referring to FIG. 1, a purse seine net combination is shown generally at 11 having a float line 12 with a plurality of floats 13 tied thereto. Floats 13 are also tied to net 16. A link chain 17 is carried by the bottom edge of net 16 with bridle chains 18 coupled to cable rings 19 by nylon ties 21. A draw cable 22 links cable rings 19.

Referring to FIG. 2, a cable ring 19 is shown with a plurality of recesses 23 therein formed by the hexagonal shape of cable ring 19.

Referring to FIG. 3, a forge formed cable ring 24 is shown with a plurality of recesses 26. A plurality of protrusions 25 together with the inner surface of cable ring 24 define recesses 26.

Referring to FIG. 4, a cable ring 27 is shown with a plurality of recesses 28.

FIG. 5 illustrates a typical out-of-round prior art cable ring 29.

OPERATION

Referring back to FIGS. 1 and 2, it can be seen that the recesses 23 of cable rings 19 will position themselves at the nylon tie 21 and /or where cable 22 exerts pressure on the rings 19. Due to the plurality of recesses 23 of rings 19 there are a plurality of orientation spots and hence a plurality of wear spots on the rings 19 from friction against draw cable 22.

The same orientation situation will exist with the cable rings 24 and 27 of FIGS. 3 and 4, respectively. Here, the recesses are formed in a different manner but the plurality of these recesses insure a plurality of wear spots on the cable rings.

A prior art type of cable ring 29 is shown in FIG. 5 with an exaggerated ellipse. Although the rings are manufactured to be in a circular configuration, it has been found as a practical matter that they are usually out of round and, hence, have a tendency to orient themselves in one particular position resulting in excessive wear in one area.

It should be understood, of course, that the foregoing disclosure relates to only a preferred embodiment of the invention and that it is intended to cover all changes and modifications of the example of the invention herein chosen for the purposes of the disclosure which do not constitute departures from the spirit and scope of the invention.

The invention claimed is:

1. In a purse seine net combination consisting of sections of netting together with a plurality of floats tied to the top portion of the net and a plurality of cable rings coupled to the bottom portion of the net with a draw cable drawn through the cable rings, the improved cable ring comprising:

a metallic ring dimensioned for receiving a draw cable therethough having a plurality of recesses on its inner surface.

* * * * *